Patented Aug. 1, 1950

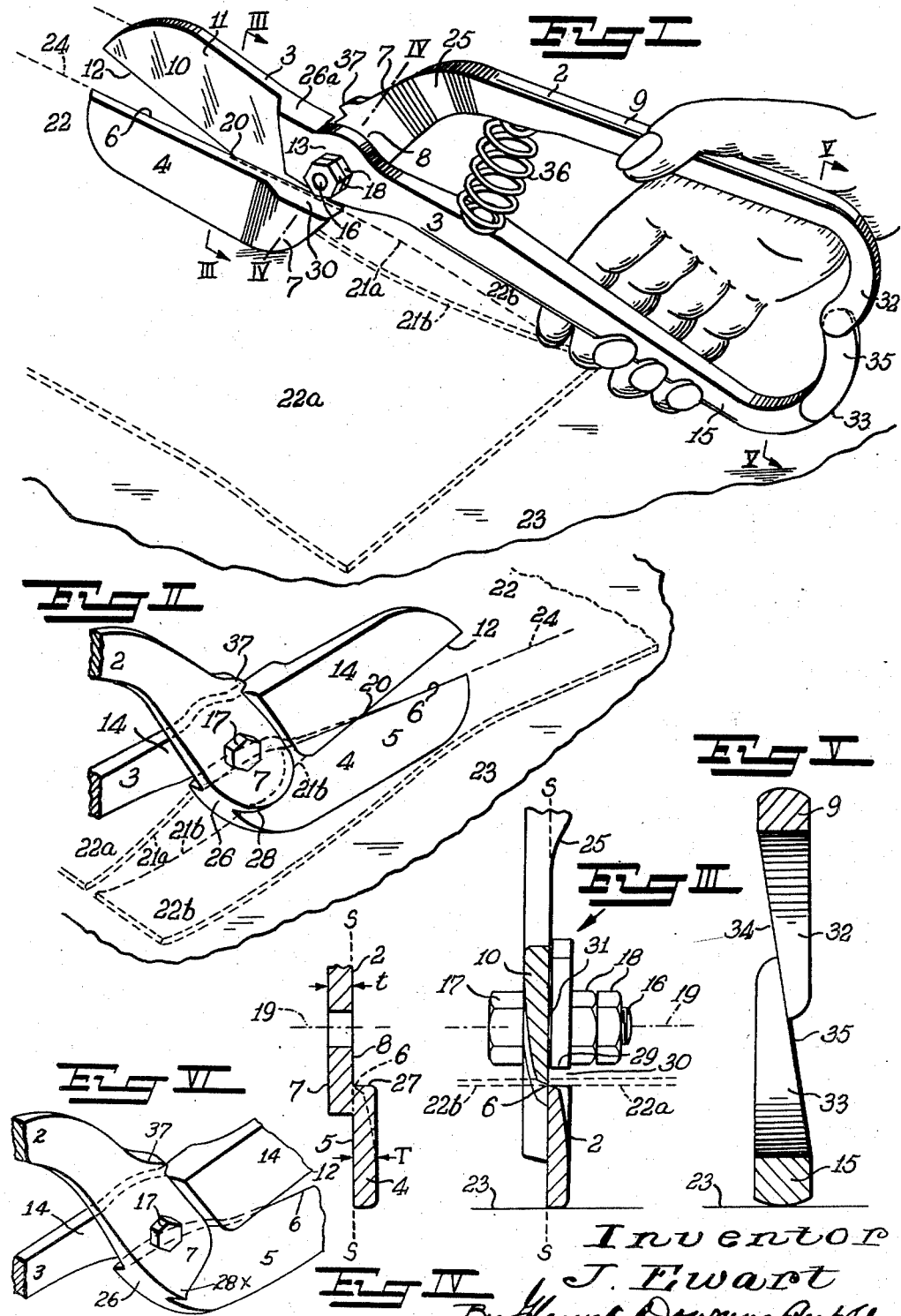

2,517,471

UNITED STATES PATENT OFFICE 2,517,471

SHEARS

John Ewart, Johannesburg, Transvaal, Union of South Africa, assignor to Harold McCartney Lawrence, Johannesburg, Transvaal, Union of South Africa Application August 2, 1945, Serial No. 608,468
In the Union of South Africa September 27, 1944

2 Claims. (Cl. 30—257)

This invention relates to shears for cutting sheet material; of the kind comprising pivoted blades, and including hand shears. The utility of the invention is developed best in the cutting of sheet metal, and correspondingly in the case of other sheet material to the extent that the latter resembles sheet metal in being highly resistive to deformation within its own plane and offering substantial resistance to being bent out of its plane.

The object of the invention is to facilitate the movement of the cut edges of the material, or one of such edges, away from the blades; and to enable bending of one of the severed portions of the sheet to be avoided.

According to the invention, in each member of the shears, the thickness of the blade is on one side of the shearing plane perpendicular to the pivot axis and the thickness of the hub is on the other side of said plane. The hub bearing surface and the blade shearing surface may be substantially in the same plane but faced oppositely to one another.

The transportation of the thickness of each member from one side of the shearing plane to the other causes the formation of a blade shoulder and in accordance with a feature of the invention, said shoulder of one, at least, of the members is limited as regards its position in the direction from the back edge of the cutting blade towards the cutting edge thereof, so that it does not extend over the line of the cutting edge of the blade.

The fact of the blade thickness and the hub thickness being on the opposite sides of the shearing plane eliminates said hub as a possible obstacle to the travel of the cut edge of a work sheet, away from the related blade cutting edge; whilst the limitation specified in the last preceding paragraph prevents the blade shoulder from being an obstacle.

In order to prevent obstruction by the pivot pin and the hub of the second shears member, one of the members is selected as the one from which the cut edges of the work formed by it shall be free to pass away without necessary deviation from a work plane parallel to the pivot axis and including the cutting edge of said selected member; and the pivot axis is positioned to be distant from said work plane or from the line of the selected cutting edge in the direction from the back of the selected blade towards the cutting edge thereof. Also the hub of the non-selected element is so limited in its radial distance from the pivot axis as to stand clear of such work plane or cutting edge line and thereby leave between itself and the blade shoulder of the selected blade, a gap for the selected cut edge to pass through.

The hub shoulder of the selected blade may be arranged to be tangential to the cutting edge of the non-selected blade so as to minimize bending of the non-selected cut edge of the work sheet. On the other hand such shoulder may be considerably extended beyond the tangential position in order to bend such non-selected cut edge.

With the object of holding the blade edges in contact, adjustable spacing means may be provided between the hub bearing surfaces; such as a washer which may be exchanged with another of different thickness to adjust the spacing.

In the case of hand shears, both members include handles that are crossed at the pivot in the usual manner and may be arranged to be wholly or to a large extent on the same side of the work plane as the pivot. The portions of said handles distant from the pivot may be arranged to co-operate, also with the object of holding the blade edges in contact. For this purpose they may be alined and arranged to contact at their internal surfaces, said internal surfaces being sloped relatively to the direction of the approach of the terminal portions so as to spread the latter apart laterally.

There may be a spring between the handles, tending constantly to force the latter apart.

A pair of hand actuated metal cutting shears is shown in the accompanying drawing by way of an example.

In the drawings—

Figure I is a perspective view of the shears from one side

Figure II is a similar view from the opposite side

Figure III is a cross section through III—III Figure I,

Figure IV is a cross section of the shears member taken on IV—IV of Figure I,

Figure V is an enlarged view of the end of the handles viewed from the section V—V Figure I.

Figure VI is a fragmentary perspective view similar to Figure II showing a modification of the invention.

The shears comprises the two elements 2, 3. The member 2 comprises, as integral parts, the blade 4 with its shearing surface 5 terminating at the cutting edge 6; the hub portion 7 providing the plane hub bearing surface 8; and the handle 9 extending backward from the hub portion 7 with reference to the blade 4 extending forwardly from said hub portion. The member 3 comprises the generally similar combination of the blade 10 with its surface 11 and cutting edge 12; the hub portion 13 with its plane bearing surface 14; and the handle 15.

The members 2, 3 are pivotally connected by the pivot bolt 16 passed through the hubs 7, 13; said bolt having the head 17 at one end and the locking nuts 18 at the other end. The bolt axis is indicated by 19. Said hubs, head, and nuts, and to some extent the handles 9 and 15, occupy a substantial space that in ordinary shears causes them to stand in the way of one or both the cut edges of the work as said edges pass relatively backward from the point 20 at which the cutting edges 6, 12 meet at any moment.

The structure described defines the shearing plane, indicated by S—S in Figures III and IV. Neglecting the small curvature in plan, which is given to the cutting edges 6, 12 in practice, and neglecting also any slight backing off of the shearing faces 5, 11 to give clearance away from said cutting edges, the shearing plane is the plane, perpendicular to the pivot axis 19, in which said cutting edges and said shearing surfaces lie; or the plane in which the cutting point 20 travels back and forth.

According to this invention the hub portion 7 of the member 2 is positioned on the opposite side of said shearing plane S—S from the blade 4 of that member. In other words (assuming the hub bearing faces 8, 14 to be plane, as they are in the example) while the blade face 5 and the hub bearing face 8 are both materially in said plane S—S, the thickness T of the blade and the thickness t of the hub extend from said plane S—S in opposite directions as shown specially in Figure III. Similarly the hub portion 13 and the blade 10 of the member 3 are respectively on opposite sides of the plane S—S, and each faces oppositely to the corresponding parts of the member 2.

When sheet metal is cut at said cutting point 20, the cut edges 21a, 21b, separate from one another at said point 20 in the direction perpendicular to the plane of the metal sheet 22, and said edges make an angle with one another corresponding to the angle which the blade edges 6, 12 make with one another at that moment.

It is convenient to arrange that such angle of separation is impressed substantially wholly on one of the cut edges and that the other cut edge be selected to continue without deviation from the general plane of the uncut portion of the sheet.

The pair of shears is shown in Figures I and II as being used by resting it on the table 23 and with the blade 4 standing vertically and square with the substantially horizontal sheet 22 of metal that is being cut along a straight line 24. This attitude of the shears is used in the following specification as a standard for describing positions.

22 indicates the uncut portion of the metal sheet. 22a indicates the more important severed portion of the metal sheet the cut edge 21a of which it is desired to keep free from being bent sharply enough or in a direction such as to impair the suitability of portion 22a for its intended purpose; the portion 22b being for instance waste or of minor importance. The cutting edge 6 of blade 4 is shown as being held horizontally with the sheet portion 22 resting on it. The plane parallel with the axis 19 and including said edge 6 is here referred to as the work plane; and is represented in the drawing by said portion 22.

In the example, the blade 4 of the member 2 is selected as the blade from which the cut edge 21a of the work can move away, substantially in line with the cutting edge 6 in plan, and without obstruction by the hub and associated structure. The displacement of the hub 7 of this element eliminates said hub 7 as a possible obstruction. Any suitable arrangement is made for displacing other possibly obstructive parts; and in the example shown this is provided for by the known expedient of displacing the pivot bolt 16, the hub 13 of member 3 and the handles 9 and 15 above the plane of the work plane.

With this object the hub portion 7 is cranked upward relatively to the cutting edge 6. The pivot bolt 16 is positioned well above the work plane, and the handle 15 of member 3 is extended materially in line with the blade 10 so that when being reciprocated it does not come below the work plane to any important extent, or if it does, it does so at a distance from the blades 4 and 10 such that the sheet portion 22a can bend downward in a large radius that is not apt to form a permanent set.

The handle 9 of the member 2 is cranked at 25, both in elevation to come reasonably parallel with the handle 15; and also in plan to compensate for the offset of the hub 7 and thereby bring the handles 9 and 15 vertically above one another.

The offsetting in each member, of the hub from the blade, causes each member 2 and 3 to include a portion 26 and 26a respectively of double thickness. In the member 2, the shoulders bounding said portion 26 are identified as the blade shoulder 27 and the hub shoulder 28.

The blade shoulder 27 is arranged to be not above the work plane; and it is convenient to arrange it in line in elevation with the cutting edge 6, when it does not encroach on the metal 26. The hub 13 of the member 3 on the other hand is arranged to be spaced above the work plane in all its positions of oscillation; and the significant portion 29 of its edge may be shaped as an arc centred at the axis 19, and of such limited radius as to leave, between it and the blade shoulder 27, the gap 30 through which the cut edge 21a passes without obstruction.

With regard to the hub shoulder 28, this may be an arc tangential (in side elevation) to the cutting edge 12 of the member 3, in which case it does not deviate the cut edge 21b further from the path of movement imparted to said edge 21b by said cutting edge 12. On the other hand, it is often desirable to give said cut edge 21b a further deviation which causes the cut strip 22b to curl up. Such further deviation may be set up by widening said shoulder 28 radially from 19 beyond said tangential position as indicated at 28x in Figure VI.

31 indicates a thin washer which may be inserted between the hub bearing surfaces 8, 14. Its thickness is so adjusted as to hold said bearing surfaces apart to the extent necessary to ensure that the blade edges 6 and 12 "see eye to eye." The adjustment is made by substituting a thicker washer, or inserting a shim, to take up wear.

The terminal portions 32, 33 of the handles 9, 15 are in the usual way bent around to come materially into vertical alinement with one another. Their internal surfaces 34, 35 are sloped across their direction of approach; and it is arranged that during the closing of the blades, said sloped surfaces 34, 35 contact with and press on one another. The resulting elastic spreading apart of the handles horizontally, assists in keeping the blades "eye to eye."

The fact that the handles 9, 15 are above the work plane and are not in the way of the cut portions 22a, 22b enables the compression spring 36 to be inserted between them. Said spring 36 constantly urges the handles apart to open the blades and thus facilitates the operation of the shears by avoiding the necessity of manually pressing the handles apart after each cut. A stop 37 limits the separation of the handles.

I claim:

1. Shears consisting of a pair of opposed shear members, each member comprising a blade and a hub integral with the blade, the members being pivotally connected to one another at an axis intersecting their hubs, the blade edges defining a shearing plane perpendicular to the pivot axis, each member having the thickness of its blade on one side of the said shearing plane and the thickness of its hub on the other side of said plane, handles extending from the hubs, the terminal portions of said handles being alined and arranged to contact at their internal surfaces, said internal surfaces being sloped relatively to the direction of the approach of the terminal portions so as to spread the latter apart laterally.

2. Shears consisting of a pair of opposed shear members, each member comprising a blade and a hub integral with the blade, the members being pivotally connected to one another at an axis intersecting their hubs, the blade edges defining a shearing plane perpendicular to the pivot axis, each member having the thickness of its blade on one side of the said shearing plane and the thickness of its hub on the other side of said plane; said axis being positioned to be distant from the cutting edge of one blade in the direction from the back of said blade towards the cutting edge of said blade, handles extending from the crossed hubs, the terminal portions of said handles being alined and arranged to contact at their internal surfaces, said internal surfaces being sloped relatively to the direction of the approach of the terminal portions so as to spread the latter apart laterally.

JOHN EWART.

REFERENCES CITED

The following references are of record in the file of this patent:

UNITED STATES PATENTS

| Number | Name | Date |
| --- | --- | --- |
| 25,508 | Heinisch | Sept. 20, 1859 |
| 513,542 | Stockman | Jan. 30, 1894 |
| 540,464 | Stockman | June 4, 1895 |
| 853,681 | Cook et al. | May 14, 1907 |
| 1,955,134 | Kowalski | Apr. 17, 1934 |
| 2,387,053 | Brown | Oct. 16, 1945 |

FOREIGN PATENTS

| Number | Country | Date |
| --- | --- | --- |
| 639,533 | France | Mar. 10, 1928 |